UNITED STATES PATENT OFFICE.

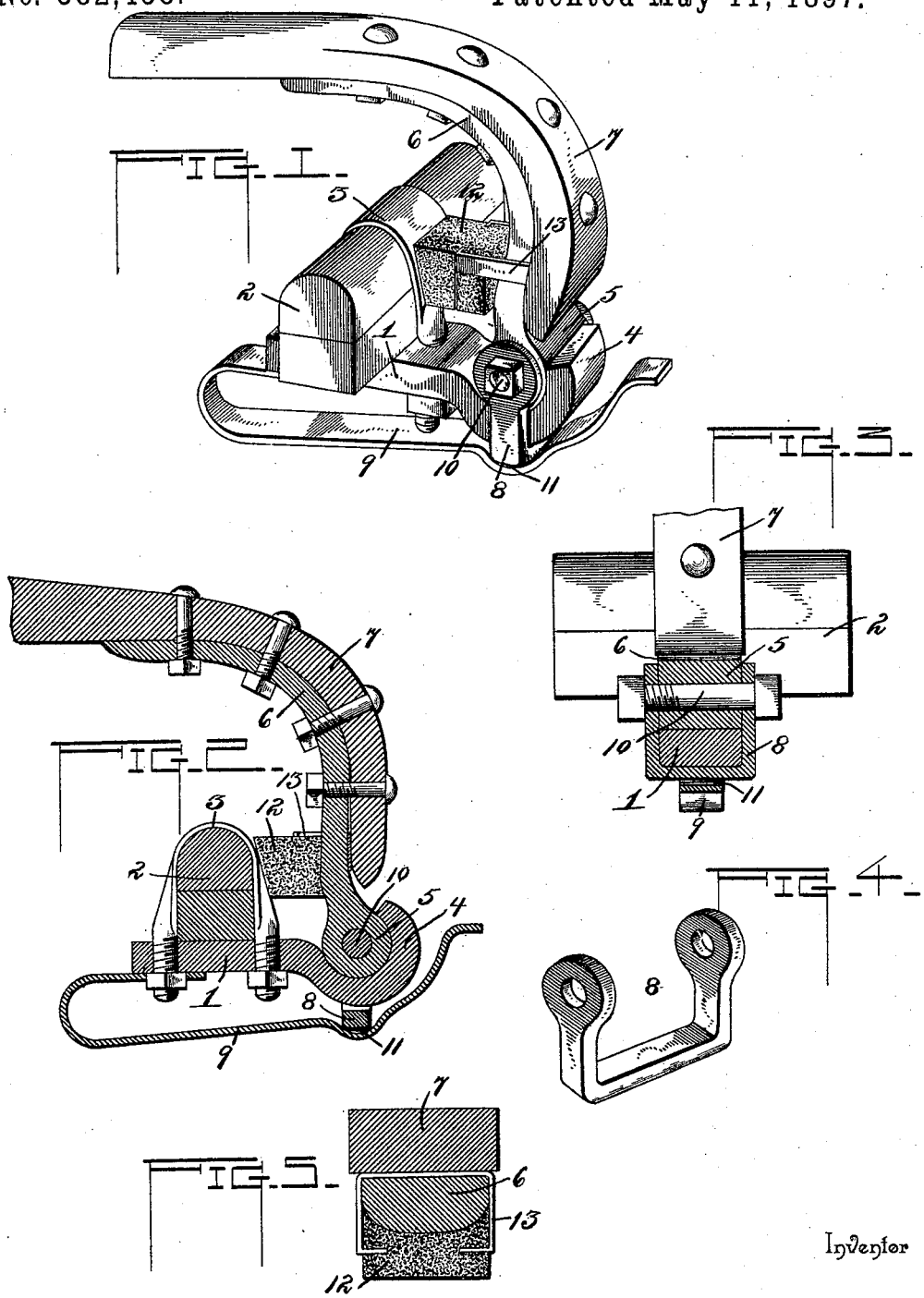

JOHN SCHEIDLER, OF COLDWATER, MICHIGAN, ASSIGNOR TO E. W. TREAT, OF SAME PLACE.

THILL-COUPLING.

SPECIFICATION forming part of Letters Patent No. 582,438, dated May 11, 1897.

Application filed May 22, 1896. Serial No. 592,595. (No model.)

*To all whom it may concern:*

Be it known that I, JOHN SCHEIDLER, a citizen of the United States, residing at Coldwater, in the county of Branch and State of Michigan, have invented a new and useful Thill-Coupling, of which the following is a specification.

The invention relates to improvements in thill-couplings.

The object of the present invention is to improve the construction of thill-couplings and to provide a simple, inexpensive, and efficient one capable of enabling thills to be readily connected with and quickly detached from a vehicle, adapted to form a perfect antirattler, and capable of supporting the thills in an elevated position when the vehicle is not in use.

A further object of the invention is to provide a thill-coupling which will bring a horse closer to a vehicle than the ordinary thill-couplings which connect the thills to the front of the axle.

The invention consists in the construction and novel combination and arrangement of parts hereinafter fully described, illustrated in the accompanying drawings, and pointed out in the claim hereto appended.

In the drawings, Figure 1 is a perspective view of a thill-coupling constructed in accordance with this invention. Fig. 2 is a central longitudinal sectional view. Fig. 3 is a transverse sectional view. Fig. 4 is a detail perspective view of the shackle or loop. Fig. 5 is a detail sectional view illustrating the manner of attaching the elastic block to the thill.

Like numerals of reference designate corresponding parts in all the figures of the drawings.

1 designates a clip-plate secured to an axle 2 by an axle-clip 3, extending rearward from the axle and provided with an upward-curved portion 4, conforming to the configuration of and forming a seat for an eye 5 of a thill-iron 6. The thill-iron 6 is secured to a thill 7, which is connected with the axle in rear thereof in order to bring the horse or other draft-animal close to the vehicle, and the eye of the thill-iron is retained in the seat of the clip-plate by a depending pivotally-mounted shackle or yoke 8 and a spring-catch 9.

The pivoted shackle or loop, which is substantially rectangular, is provided at the upper terminals of its sides with perforations receiving a coupling-bolt 10, which passes through the eye of the thill-iron and which is provided with a nut, and the depending shackle or loop 8 is capable of swinging upward on the coupling bolt or pivot in order to disengage it from the curved portion of the clip-plate to permit the thill to be readily lifted off the seat.

In attaching the thill to the axle the eye of the thill-iron is placed on the seat of the clip-plate, and the pivoted yoke or shackle is swung downward to engage it with the curved portion of the clip-plate.

The spring, which is disposed longitudinally of the clip-plate, has its front portion bent upward and secured to the front portion of the clip-plate by the front nut of the axle-clip, and the rear portion of the spring is provided at a point directly beneath the eye of the thill-iron with a bend, forming a notch or recess 11 to engage the lower transverse portion of the depending shackle or loop to lock the same against upward movement. The free end of the spring extends upward in rear of the curved portion of the clip-plate and is adapted to be readily depressed to free the knuckle or bolt to permit the same to be swung upward to release the thill.

The bottom portion of the shackle 8 fits against the lower face of the curved portion of the clip-plate, as clearly illustrated in Fig. 3 of the accompanying drawings, so that the curved portion of the clip-plate coöperates with the spring to lock the thill-iron in its bearings.

The thill is supported in a horizontal position and is prevented from rattling by an elastic block 12, of rubber or other suitable material, which is interposed between the thill-iron and the axle-clip and which is connected with the thill by a substantially rectangular clip 13. The rectangular clip 13 consists of opposite sides and a transverse portion, which is interposed between the thill-iron and the thill and is secured to the latter by the fastening devices of the former. The sides have their terminals bent inward and engaging kerfs or slots of the elastic block.

It will be seen that the thill-coupling is simple and inexpensive in construction, that it forms a perfect antirattler and shaft-support, and that it will permit the shafts or thills of a vehicle to be readily connected with and detached from the same.

It will also be apparent that the ordinary thill-iron is employed and that the clip-plate, which forms a seat for the thill-iron, extends rearward from the axle in order to bring the horse or other draft-animal close to the vehicle.

Changes in the form, proportion, and minor details of construction may be resorted to without departing from the principle or sacrificing any of the advantages of this invention.

What I claim is—

In a thill-coupling, an axle-clip having a rearwardly-extended clip-plate formed at its rear end with a circular curved portion 4, open at its upper side to form a bearing, a thill-iron having a cylindrical eye snugly registering in said bearing and removable through the open upper side thereof, a U-shaped swinging shackle 8, embracing and working over the rear curved portion 4, of the clip-plate, a coupling-bolt 10, passed through the eye of the thill-iron and fitting in the terminals of the shackle, and a spring-plate 9, having a folded front end attached to the front end of the clip-plate, said spring-plate having its rear portion curved partly around the rear curved end of the clip-plate and formed in the vertical plane of the coupling-bolt with a depression 11, having a locking engagement with the straight cross-bar of the shackle, substantially as set forth.

In testimony that I claim the foregoing as my own I have hereto affixed my signature in the presence of two witnesses.

JOHN SCHEIDLER.

Witnesses:
CLARA S. FISK,
W. E. HODGMAN.